(12) United States Patent
Fuchs et al.

(10) Patent No.: US 8,354,002 B2
(45) Date of Patent: *Jan. 15, 2013

(54) METHOD FOR EVAPORATING COMPONENTS OF A LIQUID

(75) Inventors: Paul Fuchs, Schalchen (AT); Norbert Ellinger, Postmuenster (DE); Klaus Kaeppler, Burghausen (DE); Gerhard Staiger, Kirchdorf (DE)

(73) Assignee: Wacker Chemie AG, Munich (DE)

( * ) Notice: Subject to any disclaimer, the term of this patent is extended or adjusted under 35 U.S.C. 154(b) by 606 days.

This patent is subject to a terminal disclaimer.

(21) Appl. No.: 12/446,959

(22) PCT Filed: Nov. 2, 2007

(86) PCT No.: PCT/EP2007/061825
§ 371 (c)(1),
(2), (4) Date: Apr. 23, 2009

(87) PCT Pub. No.: WO2008/055853
PCT Pub. Date: May 15, 2008

(65) Prior Publication Data
US 2009/0287009 A1  Nov. 19, 2009

(30) Foreign Application Priority Data
Nov. 10, 2006 (DE) .................. 10 2006 053 157

(51) Int. Cl.
*B01D 1/00* (2006.01)
*B01B 1/00* (2006.01)
*C07F 7/12* (2006.01)
*C07F 7/20* (2006.01)

(52) U.S. Cl. .... 159/29; 159/47.1; 159/901; 159/DIG. 1; 159/DIG. 20; 392/312; 392/387; 556/466

(58) Field of Classification Search ............... 159/29, 159/47.1, 901, DIG. 1, DIG. 20; 392/312, 392/387; 556/466; 261/139, 151, DIG. 65, 261/DIG. 72
See application file for complete search history.

(56) References Cited

U.S. PATENT DOCUMENTS

| 2,598,435 A * | 5/1952 | Mohler et al. ............... 556/468 |
| 3,656,897 A * | 4/1972 | White et al. ................. 423/316 |
| 4,251,715 A * | 2/1981 | Petersson et al. ............ 392/312 |
| 4,252,602 A | 2/1981 | Krepler |
| 4,296,082 A | 10/1981 | Lowe et al. |
| 5,877,337 A * | 3/1999 | Mautner et al. .............. 556/466 |
| 6,344,578 B1 | 2/2002 | Mautner et al. |
| 2005/0113592 A1* | 5/2005 | Wagner et al. ............... 556/472 |
| 2011/0009659 A1* | 1/2011 | Boeck et al. ................. 556/488 |

FOREIGN PATENT DOCUMENTS

| EP | 0635510 A | 1/1995 |
| EP | 0775511 A | 5/1997 |
| JP | 2002-155089 A | 5/2002 |

* cited by examiner

Primary Examiner — Virginia Manoharan
(74) Attorney, Agent, or Firm — Brooks Kushman P.C.

(57) ABSTRACT

Mixtures containing high boiling and low boiling components, at least one component being dissociatable into ions, are separated effectively by heating by passing an alternating electrical current through the mixture. The process is particularly effective in the workup of crude alkylchlorosilanes from the direct synthesis.

20 Claims, 2 Drawing Sheets

```
┌─────────────────────────────────┐
│   Heating a liquid containing   │
│    high boiler(s) and a         │
│   constituent which is a        │
│   gas at 1013mbar and 20°C      │
│    by passage of alternating    │
│   current through the liquid    │
└─────────────────────────────────┘
                 │
                 ▼
┌─────────────────────────────────┐
│      Separating a gaseous       │
│       Fraction from the         │
│         High boiler(s)          │
└─────────────────────────────────┘
```

Fig. 2

METHOD FOR EVAPORATING COMPONENTS OF A LIQUID

CROSS-REFERENCE TO RELATED APPLICATION

This application is the U.S. national phase of PCT Appln. No. PCT/EP2007/061825 filed Nov. 2, 2007 which claims priority to German application DE 10 2006 053 157.4 filed Nov. 10, 2006.

BACKGROUND OF THE INVENTION

1. Field of the Invention

The invention relates to a process for evaporating constituents of a liquid by passing alternating current through the liquid.

2. Description of the Related Art

In the process technology sector, it has been known for some time that, for an efficient heat transfer via hot surfaces, the temperature difference between heating surface and liquid to be heated must be at a maximum. However, problems arise when pursuing this maximum in the case of heating of liquids comprising gaseous and/or low-boiling components. When the surface temperature exceeds a critical temperature difference from the boiling point of the low-boiling component, a vapor film thus forms at the heating surface, which thermally insulates the liquid from the heating surface and therefore worsens the heat flow. This phenomenon is known as the "Leidenfrost phenomenon". The necessary introduction of heat into the liquid in such cases can therefore be achieved only by increasing the heat exchange area. On the other hand, however, such an increase in the heating surface area is impossible or very expensive owing to the nature of the apparatus and process prerequisites.

Alkylchlorosilanes are prepared by the route of the so-called direct synthesis from Si and MeCl. This affords a complex mixture of different alkylchlorosilanes with different boiling points. The target product is dichlorodimethylsilane with a boiling point of 71° C. (1013 mbar). In the distillative recovery of the pure alkylchlorosilanes from the product mixture obtainable by the direct synthesis, distillation residues with a boiling point of >71° C. are obtained. These are complex substance mixtures which contain compounds with SiSi, SiOSi, SiCSi, SiCCSi and SiCCCSi structures.

The composition of these so-called "high boilers" is described in detail, for example, in EP 0 635 510. As a result of the raw material or of the selective addition of catalytically active constituents, not only Si, but also further impurities of Cu, Zn, Sn, Al, Fe, Ca, Mn, Ti, Mg, Ni, Cr, B, P and C are found in the product stream of the direct synthesis. The impurities are present in suspended or dissolved form. The dissolved impurities are usually chlorides.

To heat the distillation residues, according to the prior art, for example, circulation evaporators, thin-film evaporators, short-path evaporators or heat exchangers are used. After removal of the lower-boiling components, in which the above problems exist in heat transfer, however, the thermal stability of the liquid constituents still present decreases under the influence of heat, and in the presence of the suspended or dissolved impurities. This results in oligomerization and polymerization reactions. The viscosities of the mixtures increase. This results in deposition of undesired deposits in pipelines, and in particular on the hot surfaces of the evaporators employed. Mass and energy transfer is increasingly hindered. Owing to heat transfer which has been reduced as a result, the surface temperature of the evaporator surfaces has to be increased further, which in turn leads to accelerated coverage thereof. As a result, the apparatus has to be cleaned often, the distillate yield falls, and the plant availability is unsatisfactory.

A disadvantage of the above-described prior art processes is the principle of heat introduction. Heat is transferred to the liquid silanes via hot surfaces, for example metals or graphite, which are in turn heated by heat carriers (steam, heat carrier oil) or electrical heating elements. In the case of this type of heat transfer, the surface temperature of the heat-transferring medium must be higher than the liquid to be heated. These higher surface temperatures are the cause of the problems described.

SUMMARY OF THE INVENTION

The invention provides a process for evaporating constituents of a liquid which comprises constituents A which have high boiling points and do not boil at 1013 mbar, and constituents B which are gaseous at 20° C. and 1013 mbar and boil at least 30 K lower than the high-boiling constituents A, at least one constituent being at least partly dissociated to ions, wherein the liquid is heated by passing alternating current through it.

BRIEF DESCRIPTION OF THE DRAWINGS

FIG. 2 is a process flow diagram for one embodiment of the inventive process.

DETAILED DESCRIPTION OF THE PREFERRED EMBODIMENTS

Figure 1:
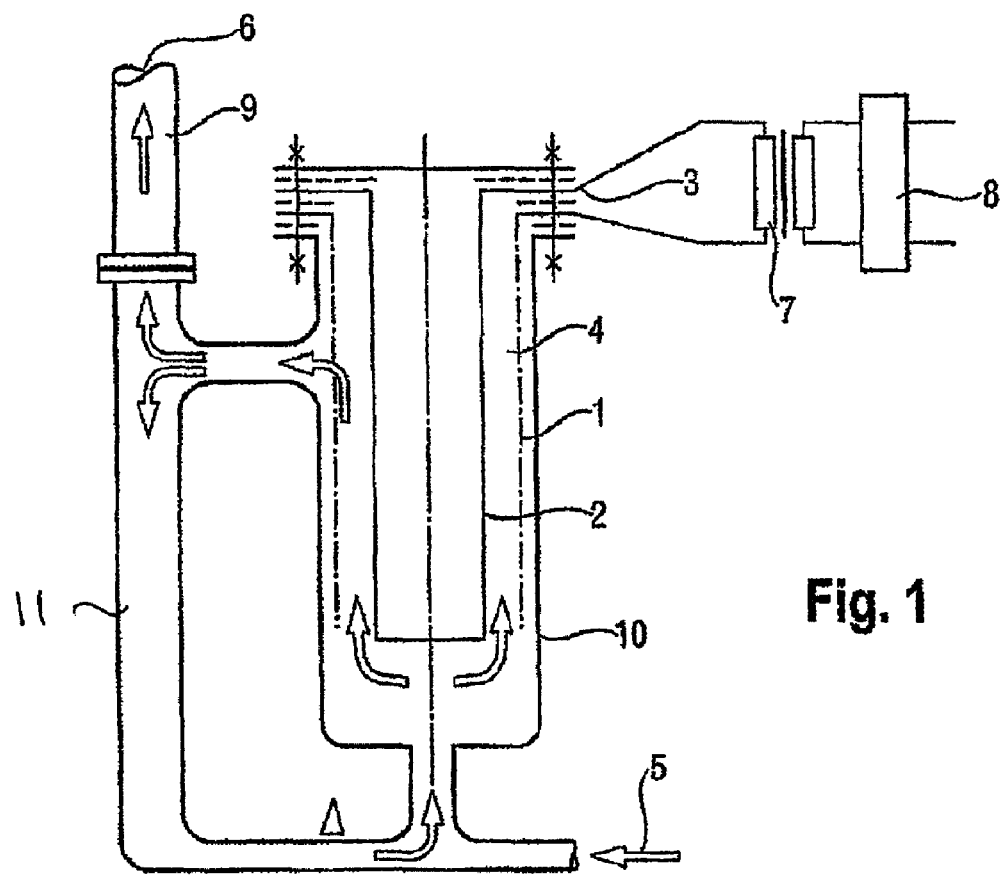
FIG. 1 illustrates one embodiment of an apparatus suitable for carrying out the process of the invention in plan view.

When electrically conductive liquids comprising gaseous and/or low-boiling components are heated by alternating current, virtually all of the energy in the liquid is utilized for heating, because no thermally insulating vapor film hinders heat transfer. The surfaces of the vessels and pipelines remain free of deposits. The heating and evaporation temperature may be regulated very rapidly and within narrow tolerances, since no heat transfer via hot surfaces is present. In the event of interruption of the liquid stream, no overheating of the liquid by hot surfaces is to be expected, and the introduction of heat can be interrupted abruptly by switching off the alternating current supply.

The electrical field generated by the alternating current causes charge carriers to vibrate, which heats the liquid. A previously nonconductive liquid can be made electrically conductive by adding suitable salts, such that the desired heating occurs when an alternating voltage is applied.

The high-boiling and nonboiling constituents A may be partly or fully dissociated to ions, i.e. may be electrically conductive, or nonconductive. When the high-boiling and non-boiling constituents A are nonconductive, the constituents B must be electrically conductive. Examples of electrically conductive constituents B are gaseous and low-boiling acids, such as formic acid, acetic acid, hydrochloric acid, nitric acid, and gaseous and low-boiling bases, such as trimethylamine, triethylamine and ammonia.

The constituents B preferably boil at least 40 K lower than the high boiling constituents A, more preferably 50 K lower than the high-boiling constituents A.

The alternating voltage is preferably at least 10 V, more preferably at least 50 V and most preferably at most 1000 V. The frequency of the alternating current is at least 10 Hz, preferably at least 30 Hz, more preferably at most 10,000 Hz, and most preferably at most 10,000 Hz. Alternating current also includes three-phase current.

The specific electrical resistivity of liquid is preferably from $10^{10}$ $\Omega$m to $10^6$ $\Omega$m, more preferably from $10^9$ $\Omega$m to $10^8$ $\Omega$m.

The process can be performed continuously or batchwise.

A preferred apparatus for the process is constructed as follows: the liquid is at rest or circulates within a tubelike heater composed of two or more tubes one inside another, which function as electrodes. The electrical alternating current is applied to the electrodes. The intermediate space of the tubes which are preferably in a rotationally symmetric arrangement is filled by the liquid, which is heated by the alternating current. The two or more internal tubes are separated by an electrical insulation and are connected to one another in an outwardly liquid-tight manner.

The materials of the electrodes must be electrically conductive and may, for example, be metals or graphite.

In a preferred embodiment, the electrically conductive fractions of an alkyl chlorosilane distillation, such as the above-described distillation residues from the direct synthesis of methylchlorosilanes with a boiling point of >71° C., are heated by passing alternating current through them. Owing to the impurities present, these have a sufficient electrical conductivity. Values of the specific electrical resistivity of from $1.10^9$ $\Omega$m to $10.10^7$ $\Omega$m are determined. The constituents which have been dissociated to ions remain in the bottoms of the evaporator in the case of a distillation, or are discharged continuously via the bottom effluent, and do not influence the quality of the distillates.

In a further preferred embodiment, the electrically conductive reaction mixtures of chlorosilanes and ethanol or methanol are heated and evaporated or outgassed by means of passage of alternating current.

In a further preferred embodiment, the electrically conductive reaction mixture is prepared from chlorosilanes, such as tetrachlorosilane, methyltrichlorosilane, dimethyldichlorosilane, trimethylchlorosilane or mixtures thereof, and an aqueous or nonaqueous alcohol, such as ethanol or methanol, by means of passage of alternating current. The conversion of the reaction can be completed only by driving out the HCl gas which forms in the reaction by increasing the temperature. Since this mixture is saturated with HCl, a thermally insulating gas layer is formed at the interface thereof in the case of heating by means of a heat exchanger. Heating by means of alternating current avoids this problem and allows inexpensive heating which is very effective based on the space requirement, since the heat is generated directly in the liquid volume and need not be transported over a large interface of a heat exchanger.

In the example which follows, unless stated otherwise,
a) all amounts are based on the mass;
b) all pressures are 0.10 MPa (abs.);
c) all temperatures are 20° C.

Example

The example is illustrated by FIG. 1, which shows a heating and evaporating apparatus as a section view.

In this apparatus, the liquid (5) enters the heating and evaporating apparatus from below, and the liquid is heated in the intermediate space (4) and exits again at the top as heated liquid or as vapor (6). Between the electrodes (1) and (2) which are in a rotationally symmetric arrangement flows an electrical alternating current. The electrodes (1) and (2) are separated from one another by an electrical insulation (3). The electrodes (1) and (2) are installed in a vertical glass vessel (10). The vapor is passed into a column with random packing (9), while an overflow of liquid is recirculated through conduit 11 to the vessel. The isolating transformer (7) and the flow regulator unit (8) feed the electrodes (1) and (2) with regulable electrical energy.

Technical data of the heating and evaporating apparatus:
electrode material: Cr, Ni steel
length of the electrode (1): 200 mm
diameter of the electrode (1): 50 mm
diameter of the electrode (2): 30 mm
electrode separation (4): 10 mm
liquid volume: 700 ml
Test results:
start of the evaporation test:
temperature of the liquid in the inlet (5) 30° C.
temperature of the liquid in the vessel (4) 30° C.
voltage: 240 V, frequency: 50 Hz, current: 0.3 A
specific electrical resistivity: $4.5 \times 10^9$ $\Omega$m
temperature (vapor) at the outlet (6) 30° C.
temperature of the electrodes (1) and (2): 30° C.
during the continuous evaporating operation:
temperature of the liquid in the inlet (5) 30° C.
voltage: 240 V, frequency: 50 Hz, current: 0.3 A
temperature of the liquid in the vessel (4) 220° C.
specific electrical resistivity: $4.5 \times 10^8$ $\Omega$m
temperature (vapor) at the outlet (6): 190° C.
temperature of the electrodes (1) and (2): 220° C.

After operation for 50 h, the surfaces of the electrodes (1) and (2) exhibited neither any deposition nor any encrustation, nor was any abrasion of the electrode material evident.

The invention claimed is:

1. A process for evaporating a liquid composed of a plurality of constituents and containing at least one first constituent with a boiling point at 1013 mbar which is at least 30° K higher than at least one second constituent,
    wherein at least one of the plurality of constituents is at least partly dissociated to ions, comprising:
        passing alternating current through the liquid and heating the liquid thereby, and
        separating a gaseous fraction containing at least one second constituent from said liquid,
    wherein the liquid composed of a plurality of constituents is selected from the group consisting of alkylchlorosilane mixtures from a direct synthesis of alkylchlorosilanes and an electrically conductive mixture prepared from chlorosilanes and an aqueous alcohol or non-aqueous alcohol.

2. The process of claim 1, wherein the at least one second constituent boils at a temperature which is at least 40 K lower than the first constituent.

3. The process of claim 2, wherein the alternating current has an electrical potential difference of from about 10 to about 1000 V.

4. The process of claim 3, wherein the specific electrical resistivity of the liquid is from $10^{10}$ $\Omega$m to $10^6$ $\Omega$m.

5. The process of claim 2, wherein the frequency of the alternating current is from about 10 to about 10,000 Hz.

6. The process of claim 5, wherein the specific electrical resistivity of the liquid is from $10^{10}$ $\Omega$m to $10^6$ $\Omega$m.

7. The process of claim 2, wherein the specific electrical resistivity of the liquid is from $10^{10}$ $\Omega$m to $10^6$ $\Omega$m.

8. The process of claim 1, wherein the alternating current has an electrical potential difference of from about 10 to about 1000 V.

9. The process of claim 8, wherein the specific electrical resistivity of the liquid is from $10^{10}$ Ωm to $10^6$ Ωm.

10. The process of claim 1, wherein the frequency of the alternating current is from about 10 to about 10,000 Hz.

11. The process of claim 10, wherein the specific electrical resistivity of the liquid is from $10^{10}$ Ωm to $10^6$ Ωm.

12. The process of claim 2, wherein the specific electrical resistivity of the liquid is from $10^{10}$ Ωm to $10^6$ Ωm.

13. The process of claim 1, wherein the at least one first constituent and the at least one second constituent are constituents of a crude alkylchlorosilane mixture from the direct synthesis of alkylchlorosilanes.

14. The process of claim 13, wherein the specific electrical resistivity of the liquid is from $10^{10}$ Ωm to $10^6$ Ωm.

15. The process of claim 1, wherein the at least one second constituent is a gas at 1013 mbar and 20° C.

16. The process of claim 1, wherein the liquid contains high boilers from the direct synthesis of alkylchlorosilanes, the high boilers having a boiling point>71° C. at 1013 mbar.

17. The process of claim 1, wherein the process takes place in a vertical vessel and an overflow stream of liquid is recirulated to the vessel.

18. The process of claim 1, wherein the liquid is the electrically conductive mixture prepared from chlorosilanes and the aqueous alcohol or non-aqueous alcohol, and HCl is separated as a gaseous fraction.

19. The process of claim 1, wherein salts are added to non-conducting first and second constituents to provide the electrically conductive liquid.

20. The process of claim 1, wherein the gaseous fraction is passed through a packed column.

* * * * *